Nov. 18, 1969  P. R. O'BRIEN  3,478,560
METAL FORMING SYSTEM
Original Filed Oct. 24, 1962  10 Sheets-Sheet 1

INVENTOR.
PAUL R. O'BRIEN
BY
Glenn, Palmer, Matthews & Lyne
HIS ATTORNEYS

INVENTOR.
PAUL R. O'BRIEN

Nov. 18, 1969      P. R. O'BRIEN      3,478,560

METAL FORMING SYSTEM

Original Filed Oct. 24, 1962      10 Sheets-Sheet 9

INVENTOR.
PAUL R. O'BRIEN

BY *Glenn, Palmer,
Matthews & Lyne*
HIS ATTORNEYS

United States Patent Office 3,478,560
Patented Nov. 18, 1969

3,478,560
METAL FORMING SYSTEM
Paul R. O'Brien, Anchorage, Ky., assignor to Reynolds Metals Company, Richmond, Va., a corporation of Delaware
Original application Oct. 24, 1962, Ser. No. 232,691, now Patent No. 3,263,315, dated Aug. 2, 1966. Divided and this application Oct. 12, 1965, Ser. No. 509,665
Int. Cl. B21c 23/18; B21d 22/26
U.S. Cl. 72—257                                                8 Claims

ABSTRACT OF THE DISCLOSURE

Apparatus for producing a wrought wheel of ductile metal comprising a first extrusion head, a second extrusion head concentric thereto and axially movable relative to said first head, a die concentric with and surrounding said extrusion heads, the internal surface of the die member being conical with the apex end thereof extending in the direction of the first head, said conical interior surface concentrically surrounding both said first and second extrusions heads, the arrangement being such that upon converging movement of the two extrusion heads metal from a disc thereof initially between the heads will be extruded in both directions between the annular openings existing between the extrusions heads and said die to form a product with cylindrical members and subsequent retraction of the second head while maintaining the die fixed relative to the first head will tend to wedge the extruded member between the die and first head to permit removal of the second head, whereafter movement of the die relative to the first head in the direction in which the second head was removed frees the extruded member from the first head.

CROSS-REFERENCE TO RELATED APPLICATION

This application is a division of copending application Ser. No. 232,691 (now Patent No. 3,263,315), filed Oct. 24, 1962, as a continuation-in-part of Ser. No. 47,831, which in turn was filed Aug. 5, 1960, and is now abandoned.

This invention relates to method and apparatus for making annular articles of wrought metal, and to articles thereby produced, especially rimmed wheels suitable for mounting pneumatic tires, such as wheels for automobiles, trucks and the like. The invention is applicable to ductile metals generally, and is particularly useful as applied to aluminum alloys in view of their high strength-to-weight ratio, their high heat conductivity, and their ornamental capabilities.

Automotive wheels are widely used and relied upon to perform safely over a long and hard service life. Light weight is particularly desirable for such wheels because it is recognized by those skilled in the art that unsprung weight should be kept to a minimum. Maximum heat conductivity is desirable, because tires wear faster as their temperature increases, and conduction of heat from the tire into the wheel and thence into the atmosphere helps to hold down the tire temperature. The ornamental value of the wheel is often an important consideration, and a wheel which has inherently good appearance does not need an expensive ornamental wheel cover. Costs of metal and fabrication must also be considered. While aluminum wheels have been produced and used successfully for airplanes, trucks and racing cars, such use of aluminum has not been extended significantly into the field of wheels for automobiles, in spite of the obvious advantages of aluminum for this purpose, partly because of the limitations of previously known designs of aluminum wheels, partly because of the expense of fabricating satisfactory aluminum wheels by previously known methods and apparatus, and partly because of failure of previous designs, processes and apparatus to use aluminum to its best advantage in such wheels.

The present invention offers successfully tested means and methods of making an aluminum wheel suitable for use on a standard automobile, and a design of aluminum wheel adapted to be produced efficiently and economically and also to pass service tests for such wheels. The invention is also applicable to other ductile metals, and is useful in production of other products, as will be apparent from the following disclosure of apparatus, methods and products embodying the invention. When reference is made to aluminum or another metal, such metal should be understood to include alloys having it as a major constituent.

For a better understanding of the invention, reference is now made to the accompanying drawings in which there are shown, for purposes of illustration only, certain present preferred embodiments of the invention. In the drawings.

Figure 1:
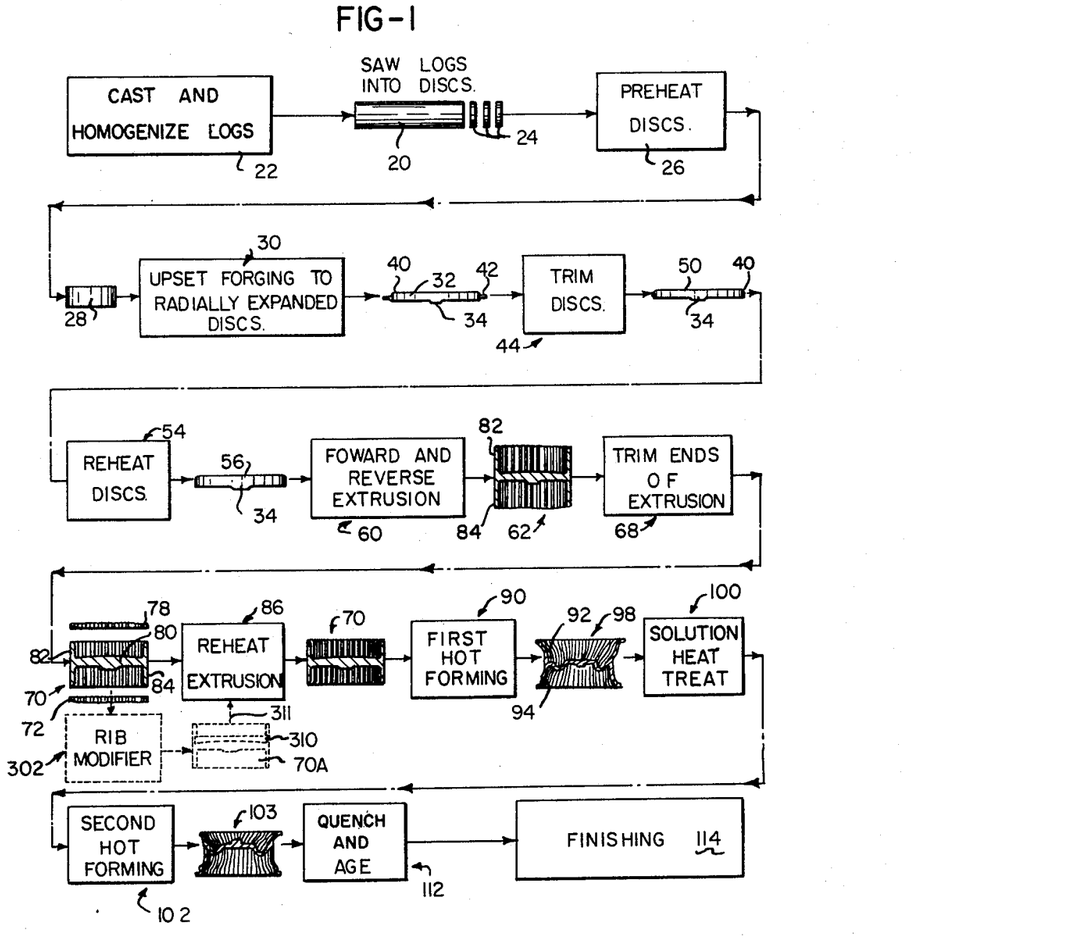
FIG. 1 is a diagrammatic showing of the apparatus and method for producing a wheel according to this invention.
Figure 2:
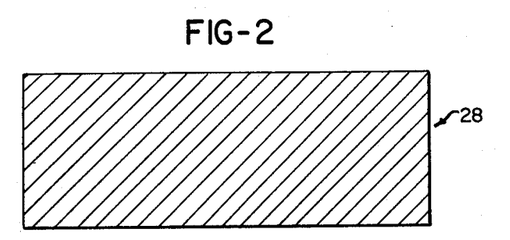
FIG. 2 shows a cross section through the axis of a cylindrical metal disc to be forged and trimmed into an annular blank.

Referring now to the drawings, reference is initially made to FIG. 1, where the present preferred practice of the invention is summarized broadly. The first step is to prepare a suitable forging blank 28 of a ductile metal, which is preferably aluminum, but may instead be magnesium or copper, for example. The blank 28 can be prepared by conventional techniques, which are illustrated by the practice of first continuously casting and then homogenizing logs of aluminum alloy, for example, as indicated at 22, then sawing the logs 20 into discs 24, and preheating the discs 24 as indicated at 26, to form the heated discs 28.

A preliminary upset forging operation in apparatus 30 reduces the thickness of the heated discs 28 to form the blanks 32, and this operation works the metal so that its crystalline structure is broken up and distributed in directions extending generally radially from the central axis of the blanks 32. The resultant blank 32 preferably has a centering boss 34 (or a cavity for the same purpose) formed integrally with it during the upset forging operation. The upset forging operation is followed by peripheral trimming of the blank 32 at 44 to eliminate any cracks that may have developed at the periphery during the upset forging. This trimming operation permits a saving of cost by omission of conventional scalping of the logs 20, in the case of good quality logs, because the portion of the log conventionally removed by scalping can be removed with the trimmed periphery of the blank 28.

Figure 3:
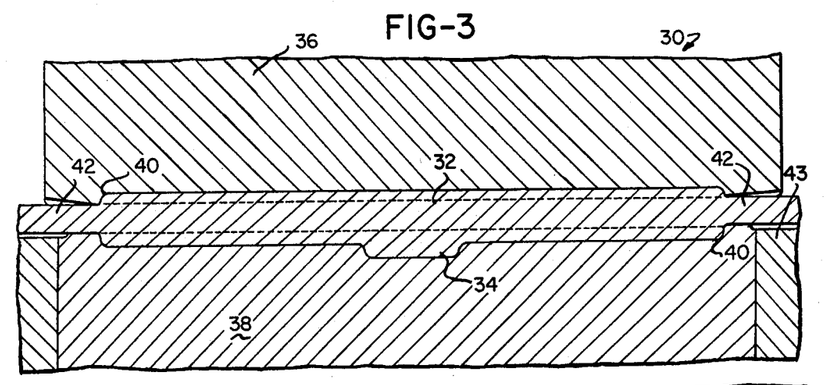
FIG. 3 shows a cross section through the axis of the annular blank forged from the disc of FIG. 2, together with portions of the forging die to produce the same.
Figure 4:
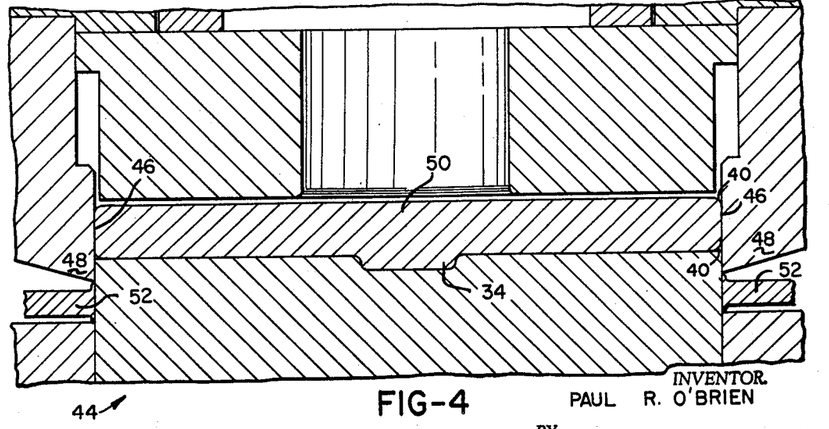
FIG. 4 shows a cross section through the axis of the blank of FIG. 3 after it has been trimmed by a trimming die, which is partially shown in FIG. 4.

As shown in FIG. 3, apparatus 30 comprises a vertically movable upper forging die 36 and a fixed lower forging die 38. The upper die forms the blank 28 into the blank 32 as shown in FIGS. 1 and 3, preferably in a single forging blow. Blank 32 has parallel flat top and bottom surfaces bounded by annular rounded shoulders 40, and an annular flash 42 extending like a flange from its outer periphery. A central boss 34 is integrally formed on one side of the blank 32, concentric with its central axis. The blank 32 is removed from forging apparatus 30, with the aid of stripper ring 43, and placed in trimming apparatus 44, shown in more detail in FIG. 4. There an annular cutting die 48 removes the flash 42; seem removed portion 52 in FIG. 4. The resultant trimmed blank 50 has a cylindrical circumference 46 bounded by the upper and lower annular shoulders 40. After preheating as indicated at 54 in FIG. 1, the preheated blank 56 is put in extrusion die 60, shown in more detail in FIGS. 8–11A and 15–17.

Extrusion die 60 performs a forward and reverse extrusion operation on blank 56 which produces an annular intermediate product 62 which is H-shaped in cross section through its central axis. Ribs (see 288 and 290 in FIGS. 5 and 6) are extruded as an integral part of the oppositely extruded walls (see 82 and 84 in FIG. 8). This product is particularly useful for subsequent operations to form an automotive wheel, but it could be readily adapted for other uses, such as manufacture of pulley wheels or other final products; for example, gear wheels could be made by forming the ribs in the shape of gear teeth inside or outside of the extruded walls.

Figures 5, 5A, 6, 7:
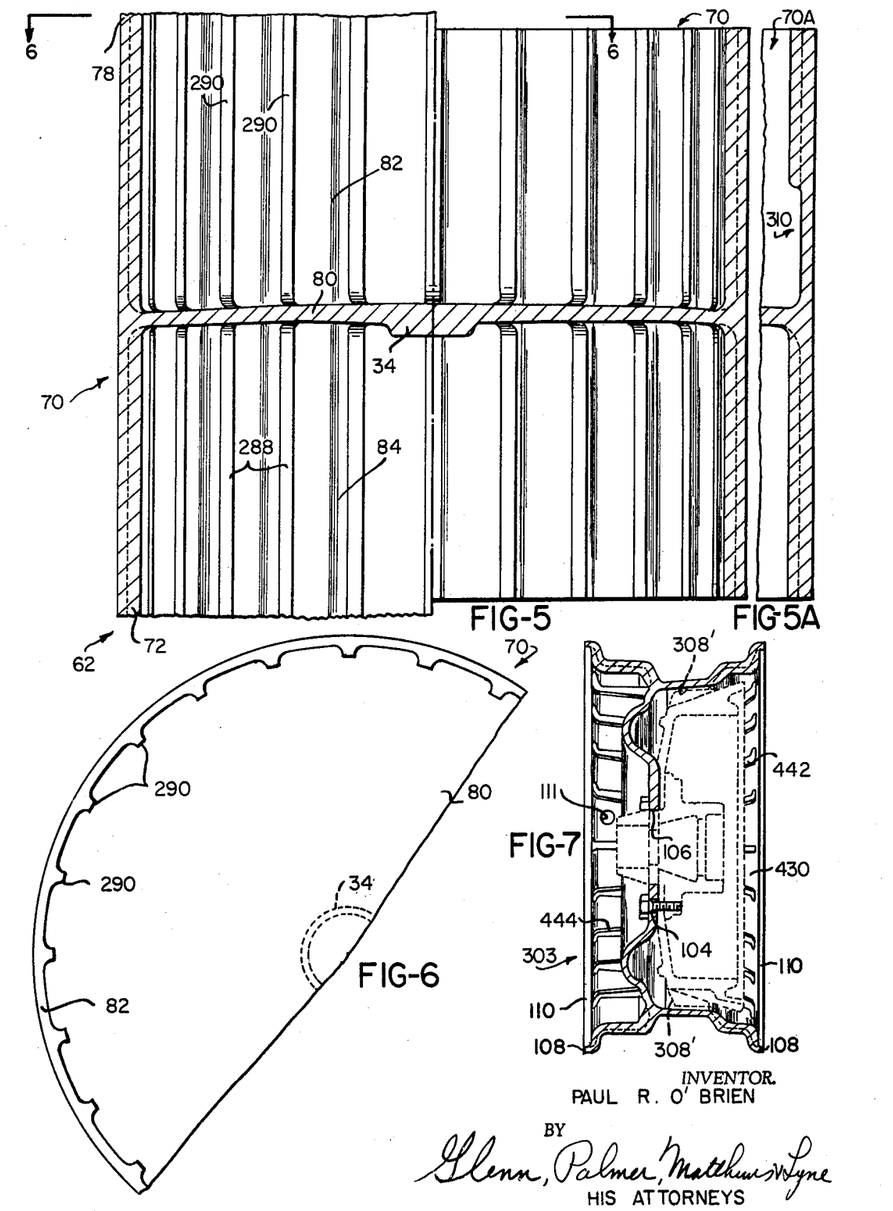
FIG. 5 is a cross section through the central axis of an intermediate annular H-shaped product formed from the blank of FIG. 4, with the side to the left of the central axis shown before trimming (broken away at top and bottom) and the side to the right shown after trimming of the top and bottom.
FIG. 5A shows a portion of one form of trimmed intermediate product, after portions of some of the ribs have been removed.
FIG. 6 shows a partial end view taken from the line 6—6 of FIG. 5.
FIG. 7 shows a cross section through the central axis of a tire mounting wheel embodying the invention and bolted to an automotive hub and brake drum (the latter being shown in dotted lines)

The opposite ends of the extrusion 62 are evenly trimmed at ends 72 and 78, as indicated at 68 in FIG. 1, to produce the trimmed product 70 and other parts of the extrusion may be removed, such as the inner ends of one set of the internal ribs (see 302, 310, 70A and 311 in FIG. 5A), in order to facilitate subsequent interfitting with a brake drum (see 308' in FIG. 7).

Subsequent forming operations 90 and 102 spread the extruded walls and form the central transverse web, to achieve the shape required for a wheel for an automobile (FIG. 7). These forming operations are preferably performed on trimmed product 70 after preheating at 86 to reach the range of temperatures recognized as suitable for hot forging of the metal of the blank, so that the force required, the die wear and the general difficulty of forming the metal is minimized. Also, in the case of a heat-treatable alloy, preheating is carried to the solution heat treating temperature of the alloy at 100 before the last forming operation 102, and the product (indicated at 103 in FIG. 1) is immediately quenched thereafter at 112, in order to save the trouble and expense of a subsequent heat treatment and quenching operation. The wheel 103 is then substantially completed, except for minor finishing operations (114 in FIG. 1) such as making or completing various openings (e.g., for receiving lug bolts and the hub, unless the hub cover is to be integral with the wheel, and for decoration or reduction of weight) and surface finishing (e.g., coining, burnishing an anodizing).

Individual stages of the system shown in FIG. 1 will now be described in more detail.

Forward and reverse extrusion

Figure 8:
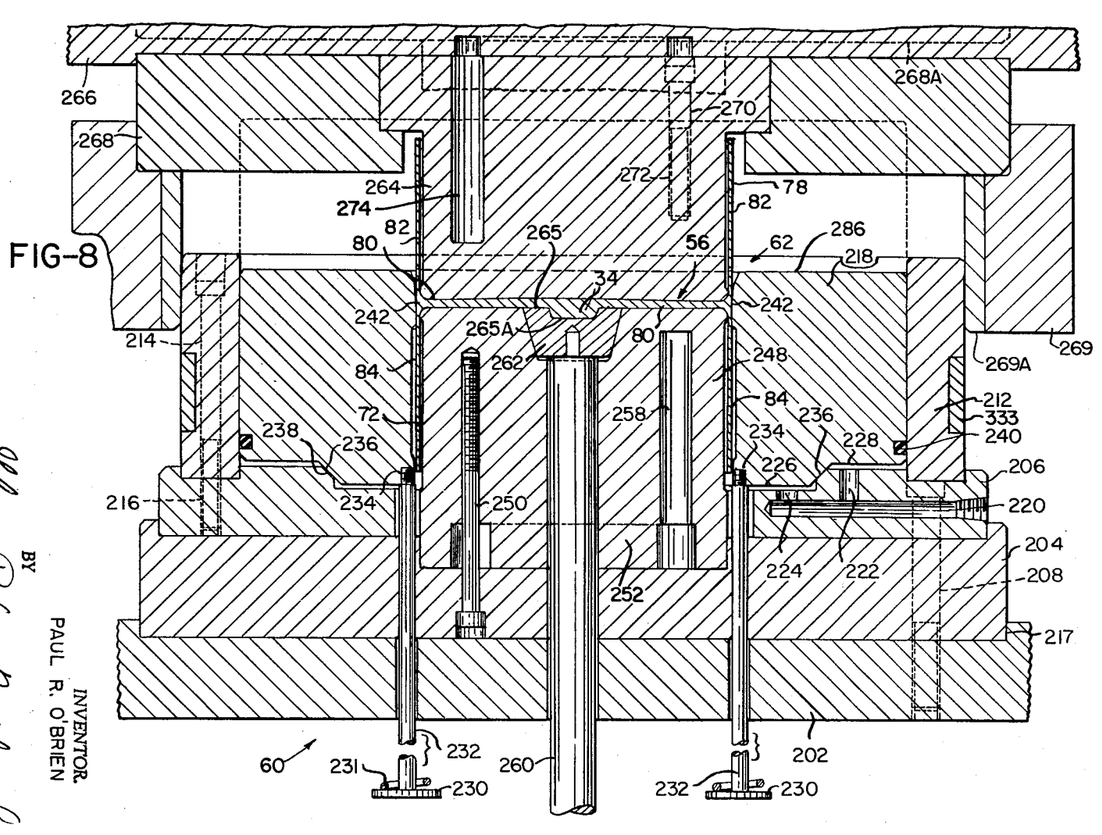
FIG. 8 shows a semidiagrammatic cross section through the central axis of a die for producing the product shown in FIG. 5 from the product shown in FIG. 4 (shown at the end of the work stroke)

Referring to the extrusion press shown in FIG. 8, a main stationary base plate 202 supports stationary subbase plates 204 and 206 secured together by bolts 208. A stationary ring 212 is secured to the plate 206 by bolts 214, threaded at 216 into plate 206. The plate 204 is countersunk in plate 202, as indicated at 217. A vertically movable circular die member 218 is movable upwardly by compressed air introduced through the conduits 220, 222, and 224 into spaces 226 and 228. Upward movement of the die member 218 loads return spring 31, which acts downwardly on discs 230 of rods 232, which are threaded to die ring 218 at 234.

When fluid (e.g., air) is introduced under pressure into conduits 220, 222, and 224, die member 218 is forced to its upper limit determined by suitable stop means (not shown) acting on the discs 230, for example. Die member 218 is returned to its lowermost position (shown in FIG. 8) by springs 231 when air pressure in conduits 220, 222, and 224 is released.

Die ring 218 has a centering conical surface 236 engageable with conical surface 238 of subplate 206, which centers and provides the lower limit of travel for ring 218. A neoprene sealing O-ring 240 is a groove around die member 218 slidably engages and seals against the ring 212. Die member 218 has a substantially cylindrical surface 242 (FIGS. 8–11, 15, 16 and 17) which provides the outer travel limit and guide for the forward extrusion 84 and the reverse extrusion 82 of the member 62.

A lower extrusion-producing punch 248 is fixed to the plates 206 and 204 by bolts 250. Punch 248 has its lower end 252 countersunk into plate 204 to engage and be centered by the plate 204.

Figure 17:
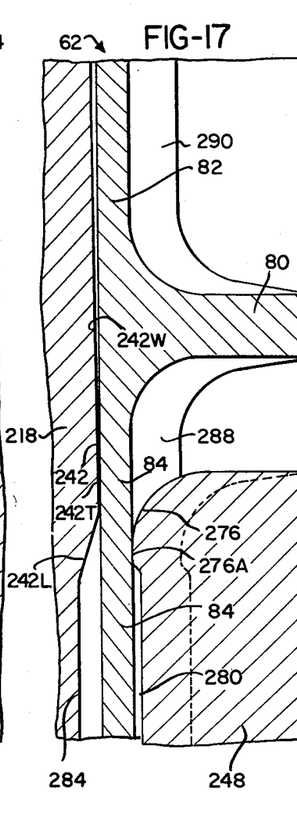
FIG. 17 is a view similar to FIG. 16, but showing a later stage when the upper punch has been fully withdrawn and the surrounding cylindrical die has been partially lifted, carrying the extrusion with it.

A piston 260 having a knockout head 262 is hydraulically movable upward to aid in pushing the extrusion from punch 248 (FIG. 17). The head 262 is in the form of an inverted truncated cone and has a flat top surface 265 with an indentation 265A engageable with the centering boss 34 of the blank 56.

The movable punch 264 is secured to the movable upper press member 266 by means of a movable plate 268 secured to member 266. The punch 264 is secured to the plate 268 by screw bolts 270 threaded at 272 into the punch 264.

Electric heaters 258 and 274 preheat the punches 248 and 264 to substantially below the preheat tempetrature of the workpiece (high enough to avoid cracks in the extruded walls and ribs, and to reduce the pressure necessary to complete the extrusion, but low enough to prevent any part of the product from melting or recrystallizing so that it loses its wrought character, or from welding to the forming dies or punches. In the case of aluminum alloys, this punch preheat temperature is preferably 350–400° F.).

Movable plate 268 is provided with a cylindrical guide ring 269 secured to adjustable wear plates 269A which are adjustable to engage the ring 212 to center the punch 264 with respect to the die 218. The upper position of plate 268 is indicated diagrammatically in FIG. 8 by the dotted line 268A.

Figures 9, 9A, 10, 11, 11A:
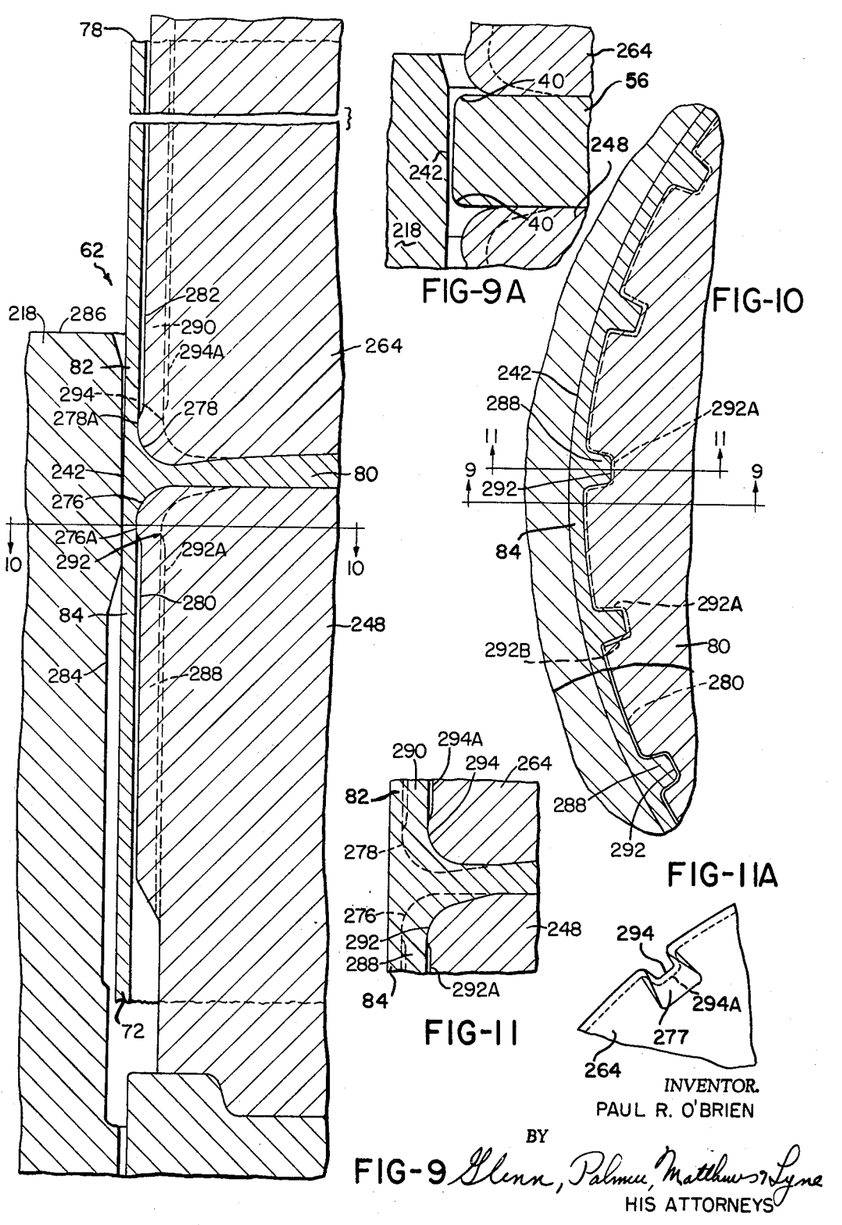
FIG. 9 is an enlarged view of a portion of FIG. 8, such figure being taken along the lines 9—9 of FIG. 10.
FIG. 9A is a further enlarged cross-sectional view, partially broken away, corresponding to the central portion of FIG. 9, but showing the press punch and die members and workpiece at the time pressure is initially applied to the workpiece.
FIG. 10 shows a section taken along the line 10—10 of FIG. 9.
FIG. 11 shows a section taken along the line 11—11 of FIG. 10.
FIG. 11A is an end view of one of the punches shown in FIG. 11, and typical of the end view of the other punch.

When movable punch 264 is raised, the preheated blank 56 (FIG. 1) is placed on punch 248, within the vertically movable die member 218, and is centered by engagement of its boss 34 with cavity 265A. At this time die member 218 is in its lowermost position (as shown in full lines in FIG. 8), closely spaced around the periphery of blank 56 (FIG. 9A).

The upper punch 264 then moves downward to engage the blank 56 (FIG. 9A) and to cause the metal to flow radially outward against the limiting cylindrical surface 242 and then to extrude (beginning at the rounded shoulders 40) to form oppositely extruded cylindrical walls 84 and 82 of the product 62 shown in FIGS. 5 and 6. These walls are integral with a transverse wall 80 formed of the unextruded metal of blank 56.

Fixed punch 248 has an annular extruding die 276 formed around it, and movable punch 264 has a similar extruding die 278 formed around it (FIGS. 9–11A and 15–17). Punch 248 has an outer wall 280 below and of less diameter than extruding die 276 and punch 264 has a similar reduced diameter outer wall 282 above extruding die 278. These walls 280 and 282 are thus relieved to allow the extrusions 84 and 82 respectively to pass by them without touching them, to avoid friction.

Die ring 218 has an internal annular die wall 242 of substantially cylindrical shape, but with a slight conical taper of increasing diameter towards the top (from plane 242J to plane 242K indicated in FIG. 15) in order to facilitate removal of the completed work piece by lifting it above die 218 (e.g., an increase of diameter of 0.005 inch from 242J to 242K, where the internal diameter of die ring 218 is in the order of 12 inches and the axial distance from 242J and 242K is about 2 inches). The die wall 218 provides a pair of annular extrusion die surfaces spaced evenly around and cooperating with the annular extrusion dies 276 and 278, respectively, thereby forming two pairs of opposite annular dies which form extrusions 82 and 84. The distances between die wall 242 and extrusion dies 276 and 278, respectively, are substantially equal in the present preferred practice of the invention, and provide substantially equal wall thicknesses in the extrusions 82 and 84. Tapered surfaces 242M and 242L (FIG. 15) above and below die wall 242 avoid engagement and consequent friction with extrusioned walls 82 and 84 respectively. Tapered surface 242M is terminated by upper surface 286 of die ring 218. Tapered surface 242L terminates in internal cylindrical wall 284 of die ring 218, which has an enlarged diameter in order to avoid engagement and consequent friction with extrusion 84.

Ribs or the like are readily formed integrally with the extruded cylindrical walls 82 and 84, by indenting the extruding dies and adjacent relieved walls. In the present preferred practice of the invention, the extruding dies 276 and 278 are indented at 292 and 294 (FIGS. 9, 10, 11 and 11A) to form ribs 288 and 290 integral with extruded walls 82 and 84, respectively, and extending along the inner sides of these walls and parallel to their central axis. The walls 292A and 294A of punches 248 and 264 adjacent die indentions 292 and 294 are in the form of relieved channels which are spaced from and cause no friction with the ribs as they are extruded. The ribs are all of equal size and are evenly spaced along each wall with each rib on one wall opposite to a like rib on the outer wall. Such an arrangement of substantially identical and symmetrical oppositely extending extruded ribbed walls is preferred for the opposite extrusion operation of the invention, since the metal evenly divides and flows under like conditions in opposite directions. Such metal flow is further aided by rounding the corners of extrusion dies 276 and 278 where the metal approaches die surfaces 276A and 278A (such rounded corners being shown where the numerals 276 and 278 are applied in FIGS. 15 and 16). The metal required for the formation of the ribs 288 and 290 is gathered and fed into the rib forming channels 292 and 294, FIGURES 11 and 11A, by the scooping and convergent lead-in channels 277 in the lower surface of upper punch 264 (see FIG. 11A), and the like channels formed in the upper surface of lower punch 248. The outwardly and the radially flowing metal of blank 56 is gathered and directed by these channels 277 into the rib forming channels 292 and 294 to provide the additional metal required for the formation of the ribs 288 and 290.

Figure 15:
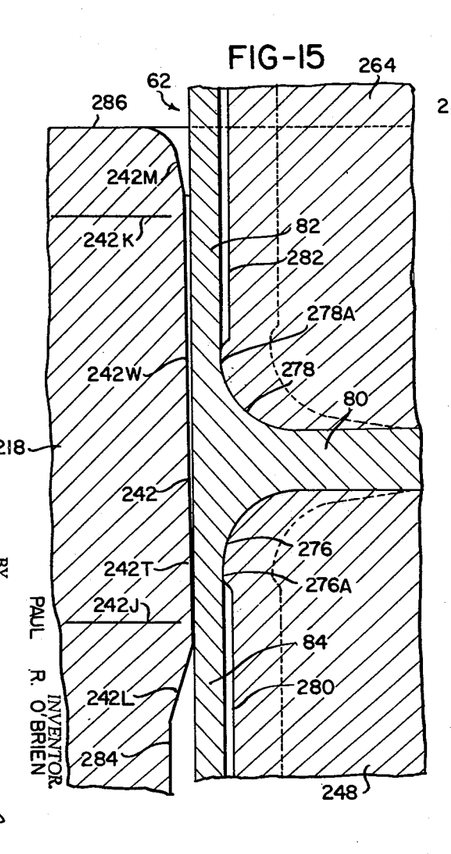
FIG. 15 is an enlarged cross section of a portion of FIG. 9.
Figure 16:
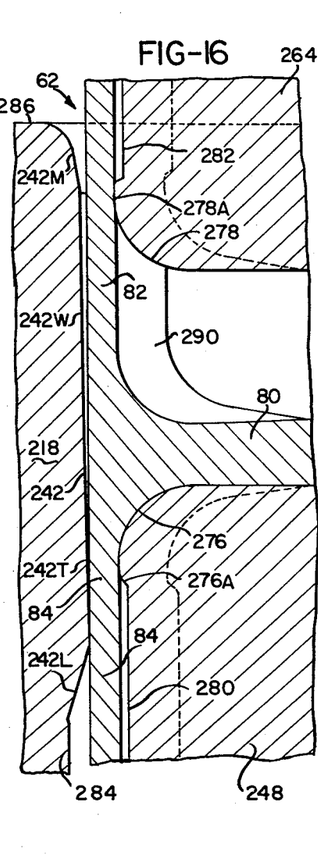
FIG. 16 is a view similar to FIG. 15, but showing the upper punch partially withdrawn.

FIGS. 15, 16 and 17 illustrate how the extrusion 62 is removed from the press 60.

FIG. 15 shows the upper punch 264 at the bottom of its stroke. FIG. 16 shows the punch 264 being moved upwardly while the die 218 and the lower punch 248 remain stationary. The extrusion 80, 82, 84 also remains stationary as the extruding surface 276A of the stationary extruding head 276 exerts a slightly stronger pinching action on cylindrical wall 84 with the opposing surface 242 at zone 242T than was produced by the pinching action on cylindrical wall 82 between the extruding surface 278A of the movable punch 264 and the upwardly flaring surface 242 at zone 242W, FIG. 15. The outward flare at 242W allows the punch 264 to move upwardly with a decreasing pinching action whereas a stronger pinching action tends to be produced at 276A.

Any tendency of movable punch 264 to pull the extrusion wall 82 with it causes the movable die 218 to tend to move with the extrusion also. The taper of the die wall at 242T then tends to pinch the extrusion harder against the stationary punch surface 276A. This helps to prevent the upper movable punch from pulling the extrusion up with it.

Once the upper punch 264 moves slightly upward, the upward pull on the upper extruded wall 82 becomes less and less in comparison to the increasing pinching action on lower wall 84. Hence the punch 264 can readily be pulled upwardly as indicated in FIG. 16 without materially pulling up the extrusion. Eventually punch 264 can be pulled up out of the way without pulling the extrusion with it and without deforming the extrusion in so doing.

FIG. 17 shows the movable die 218 being moved upward after the upper punch 264 has moved up a sufficient distance completely to withdraw from cylindrical wall 82. The die 218 is moved upward by the pressure of compressed air which is introduced through passageway 220 (FIG. 8). This compressed air distributes itself under the lower surfaces 226 and 228 of die 218 and under the exposed under surfaces of the horizontal wall 80 of the extrusion while being confined by the seal 240 of FIG. 8. Hence them ovable die 218 is forced upwardly and carries the extrusion 80, 82, 84 upwardly with it, as indicated in FIG. 17, for the distance of upward travel of die 218, which distance may be 6 inches.

When the die 218 is stopped in its upward travel by abutments, not shown, on rods 232 (FIG. 8), the extrusion 80, 82, 84 may be moved upwardly further by the compressed air, aided by operation of the knockout punch head 262.

The die 218 is then returned to its lower position by rods 232 while the upper punch 264 and the knockout punch head 262 remain in their top positions. This removes the extrusions 80, 82, 84 from the die 218.

Thereafter the knockout punch head 262 is lowered while the upper punch 264 remains in its upper position. The extrusion 80, 82, 84 remains on top of die 218 and is then removed from the press 60. Another heated blank 56 is then placed on the lowered punch head 262 and stationary punch 248 to repeat the cycle.

First forming after extrusion

The extruded product 70 of H-shape cross section (FIGS. 1 and 5) is subjected to an initial hot forming operation in the press 90 (FIG. 12) to spread the extruded walls 82 and 84, and to shape the web 80 into the product 98. This forming action might complete the entire wheel formation 103 in one operation in some instances, but in the illustrated embodiment of the invention the press 90 performs only the first part 98 of the forming operation, which is subsequently completed in the press 102 (FIG. 13).

Figure 12:
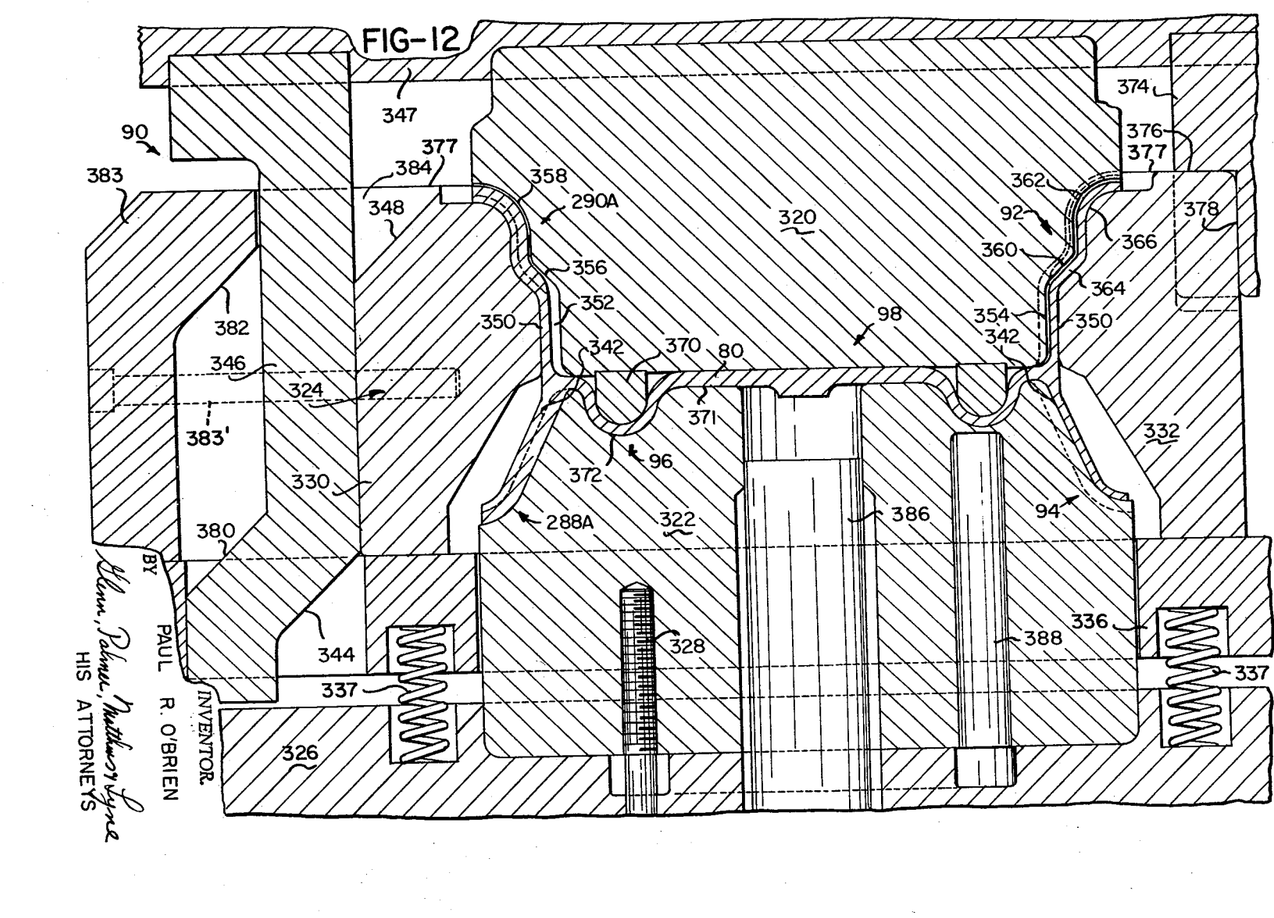
FIG. 12 shows a semidiagrammatic cross section through the central axis of a cam operated split die press for initiially spreading the cylindrical walls of the intermediate product shown in FIG. 5A (shown at the end of the forming movement)
Figure 13:
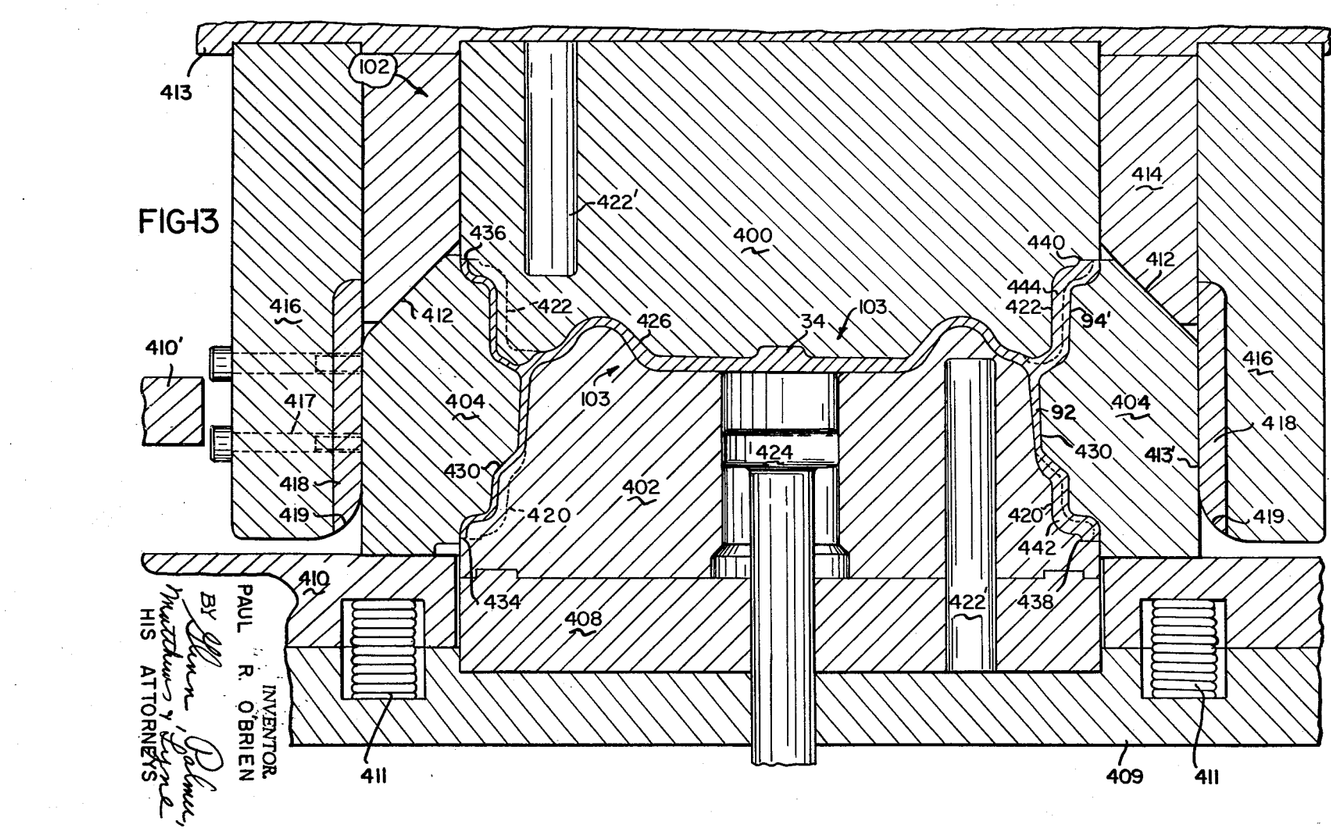
FIG. 13 shows a semidiagrammatic cross section through the central axis of a second cam operated split die press, to produce a further spreading action and web-forming action on the product of the die of FIG. 12 (shown at the end of the forming movement)

Referring to FIG. 12, the press 90 has a fixed central die 322 secured to a base plate 326 by bolts 328. An upper central die 320 is secured to a vertically movable member 347 and has its central axis aligned with the central axis of the central die 322. The lower die 322 is not intended to form reverse curves in the extruded wall 84, and consequently requires no cooperating die against the other side of the extruded wall 84. For purposes of forming other shapes, a cooperating die could readily be provided, as will be obvious to those skilled in the art.

Figure 14:
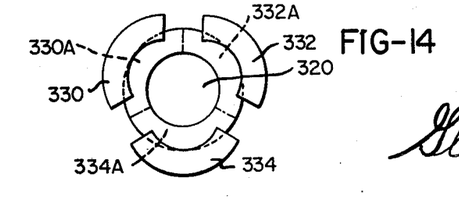
FIG. 14 is a diagrammatic plan view showing the general action of the cam dies of FIG. 12 (and somewhat similar to the action of the dies of FIG. 13)

The upper central die 320 does impart a reverse curve to the extruded wall 82, and cooperates with surrounding contractible die 324 consisting of die segments 330, 332 and 334 (FIG. 14).

These segments are supported by a vertically movable pad or support 336 on which the segments are radially and horizontally slidable. The ring segments and pad are vertically movable to an upper product receiving and removing position.

The segments and pad are also movable downwardly to contract the segments to the dotted line positions 330A, 332A and 334A of FIGURE 14 to produce the forming operation.

In their upper position, the segments are in the spread apart or retracted positions shown in full lines in FIGURE 14. After the product 70 is inserted inside the segments, the segments are moved radially inward to encircle the product while the die 320 is moving downward. The segments, die 320 and pad 336 eventually are moved to their lowest position shown in FIGURE 12, at which time the formation of the product 70 into the product 98 has been completed.

The die ring segments 330, 332 and 334 can be contracted and expanded, and locked in contracted position, by any convenient means. In the illustrated embodiment, the press 90 operates the die segments 330, 332 and 334 by cam action. For that purpose, a conventional cam member 346 is secured to the vertically movable member 347. On the downstroke of member 347, the member 346 has a sloping cam surface 344 which engages a sloping cam surface 348 in the notch 384 on die ring segment 330 to move the segment radially toward the central axis of the central dies 320 and 322. On the upward return stroke, member 346 has a sloping cam surface 380 which engages a sloping cam surface 382 of a member 383 which is forced leftwardly. The member 383 is secured to ring die segment 330 by means of a bolt construction 383' which pulls the die segment 330 outwardly with member 383 as the member 383 is moved out by cam 380. The cam member 346 is circumferentially offset from bolt 383', or may be suitably notched, to allow cam member 346 to move vertically without engaging the bolt construction 383'. The member 383 is slidable on platform 336, in order to move die segment 324 radially away from the central axis of central dies 320 and 322. Similar members 346 and 383 are provided for and simultaneously cam the other die segments 332 and 334 to and from their contracted positions.

As shown to the right of FIG. 12, the die segment 332 has been encompassed and held in its contracted position by the vertical surface 378 of a member 374 which is secured to the vertically movable member 347. This vertical surface 378 does not engage die segment 332 until after segment 332 has been cammed into its contracted position by its respective member 346, and member 374 slides out of engagement with die segment 332 before the segment is cammed away from its contracted position by its respective cam surface 380. The horizontal surface 376 of member 374 engages the top 377 of member 332 and pushes it down with pad 336 against the resistance of springs 337 at a later stage of the downward stroke. Similar members 374 are provided for the other die segments 330 and 334.

Each die segment 330, 332, 334 has a corresponding cam member 346 to cam the respective segment into contracted position by surface 344 and to retracted position by surface 380. Each die segment 330, 332 and 334 also has a holding member 374 which holds the respective segment in contracted position by surface 378 and which pushes the respective segment down by surface 376. However, the cam member 346 and holding member 374 for each segment are circumferentially offset with respect to each other sufficiently so they both may act on their respective segment without interference from each other.

The compression springs 337 are sufficiently strong to hold the pad 336 in its upper position while the surface 344 is striking the surface 348. The springs 337 do not yield materially against downward pressure on the pad 336 until the surface 376 strikes the top surface 377 of the respective segment near the end of the downward stroke of die 320.

In the beginning of the operating cycle of the press 90 the ring die segments 330, 332 and 334 are in their retracted positions, and the vertically movable member 347 and central die 320 are in their raised positions. The preheated extruded product 70 is placed in the press, and the member 347 is moved rapidly down by conventional cam means (not shown). The die segments 330, 332 and 334 are cammed into their contracted positions by cam surfaces 344 which does no more than bring them into contact with part of the sides of the extruded product 70. Continued downward movement of the member 347 brings the central die 320 down with surface 354 telescoping into surface 82 of the extrusion. Further downward movement of die member 320 causes surfaces 360 and 362 gradually to spread the surface 82 against the segment surfaces 350, 364 and 366 of the segments 330, 332 and 334. At the same time the ribs 290 are forced into grooves 352, 356 and 358 in die member 320 to form outwardly flared ribs 290A. The groove portions 352 are used when ribs 290 are not cut at 310, FIG. 5A.

The springs 337 are strong enough to resist much downward movement of the segments 330, 332 and 334 and pad 336 during the spreading of the upper wall 82 of the extrusion.

Thereafter the respective surfaces 376 strike the respective top surfaces 377 of segments 330, 332 and 334 and move the segments down in unison with the die member 320 to force the extrusion wall 84 down the stationary conical surface 342 and spread the wall 84 outwardly. At the same time the ribs 288 are spread out as shown at 288A. The springs 337 yield to the downward pressure of the surface 376 on the tops 377 of the segments, which downward pressure is transmitted to pad 336.

The downward motion is arrested at the position shown in FIG. 12 at the bottom of the stroke by the cam action which reciprocates die 320 and support member 347.

An annular protruberance 370, fixed integrally to the bottom of the upper central die 320, cooperates with an annular channel 372 in the top surface of lower central die 322 to shape an annular crown 96 in the web 80 of the extruded product.

For purposes of facilitating this forming operation, all of the dies are preferably preheated. One of the preheating means 388 (such as electric heater coil) is illustrated as imbedded in the lower central die 322. Other heaters may be provided wherever required, in all of the die members, such as at 333, FIGURE 8, etc.

In the stripping action of FIGURE 12, die 320, segments 330, 332, 334, pad 336, cam 346 and member 374 initially rise together by the combined action of springs 337 and the upstroke of the cam which operates die 320. The segments 330, 332 and 334 at first remain in contracted condition and pull the product 98 upwardly off the stationary die 322.

The segments 330, 332, 334 and slidable cam member 383 may be slidably locked to pad 336 in locking grooves in the pad (not illustrated, but well known). When the members 320, 346 and 374 continue to rise because of the upward pull of the continued upstroke of member 347, the pad 336 is arrested in its upward motion by a stop member, not shown, but similar to stop member 410' in FIGURE 13. This also stops upward movement of segments 330, 332, 334 and cam member 383.

Further upward movement of members 320, 346 and 374 on the upstroke causes members 374 to move up above the upper surfaces 377 of the segments to permit outward movement of such segments by continued upward movement surfaces 380 acting on surfaces 382. This outward movement of the segments releases the product 98 which falls on die 322 or on stripper plunger 386 which has been moved up to receive the product.

The product is then removed by tongs or the like and the plunger 386 is retracted in time to permit proper subsequent spreading action on a fresh H-shaped extrusion.

Second forming after extrusion

The product 98 removed from the press 90 (FIG. 12) is further formed in the press 102 shown in FIG. 13 to produce the substantially finally shaped wheel product 103. The product 98 is preferably heated to a temperature in the range of hot forging temperatures conventionally recommended for the particular metal being formed. In the case of heat-treatable alloys, the product 98 is more particularly heated to the solution heat-treat temperature of the alloy, as at 100 (FIG. 1) and the product 103 is quenched as at 112 (FIG. 1) immediately after it has been formed in the press 102 (FIG. 13). This arrests precipitation of the constituents of the alloy put into solution at the solution heat-treat temperature, and subsequent artificial or natural ageing, according to conventional metallurgical practices, give the product 103 the desirable increased strength of heat-treated wrought alloy product.

Referring now to FIG. 13, the press 102 has an upper central die 400 and lower stationary central die 402 corresponding generally to dies 320 and 322 shown in FIG. 12, and has four die segments 404 radially contractible like the three die segments 330, 332 and 334 shown in FIGS. 12 and 14. The ring die segments 404 are carried on a platform 410 adjustably mounted on the base plate 409 by springs 411. The lower central die 402 is secured to a fixed base plate 408, which is secured to base 409, and the upper central die 400 is secured to a vertically movable plate 413 which also carries cam operating means or members 414 and 416. Cam plates 418 are secured to the cam operating members 416 by bolts 417 so they may be replaced as desired, for adjustment, etc. As the cam operating members 416 move down with the upper central die 400 the inclined surfaces 419 on the lower edges of cam plates 418 engage sloping upper cam surfaces 412 on the die segments 404. Continued downward movement of the cam surfaces 419 against the cam surfaces 412 simultaneously forces the die segments 404 radially inwardly, and they are thereafter held radially inwardly by engagement of their vertical back surfaces 413' with the vertical surfaces of cam plates 418.

Near the end of the down stroke of die 400 (produced by a vertical motion cam construction, or the like, not shown) the lower slanting surfaces of cam members 414 engage the upper slanting surfaces of segments 404 at 412 after the segments 404 have been contracted by cam plates 418. This produces a positive downward push on segments 404 and pad 410 with sufficient strength to overcome the resistance of springs 411 and to push the pad 410 against base plate 409. Previously the springs 411 had maintained the pad spaced from base 409.

The dies and punches are preferably provided with preheating electric heaters as indicated at 422', and elsewhere, if desired. A vertically movable knockout member 424 is provided to hold the completed product 103 above the lower central die 402 at the end of the press operation.

The preheated product 98 is inverted relative to its position shown in FIG. 12 before it is placed in the press 102 shown in FIG. 13. This brings the central locating button 34 into engagement with a corresponding centering cavity formed in the upper central die member 400. If desired the button 34 and the centering cavity for the button may be elongated or otherwise made circumferentially irregular so the button may also be used to orient the ribs with the die rib grooves. The irregular button receiving cavities may be provided in all of the die constructions with which the button engages.

The shaping of the rim wall 92 is partially completed in the press 90 shown in FIG. 12, so that only some forming is done between the lower central die 402 and the four surrounding dies of the press 102 shown in FIG. 13 to produce or make effective the various shapes 420, 430, 434, 438, 442, illustrated in FIG. 13. However, the initial cammed movement of the four surrounding dies 404 first forces these surrounding dies against the wall 94 formed by the press 90 shown in FIG. 12, and subsequently continued downward movement of the upper central die 400 shown in FIG. 13 causes the latter die to cooperate with the said surrounding dies to shape the wall 94 into the wall 94' shown in FIG. 13, to produce or make effective the various shapes 422, 426, 436, 440.

When the press 102 reaches the position illustrated in FIG. 13, the shaping of the product 103 in the press has been completed, and the upper central die member 400 is quickly returned to its raised position, and the surrounding segments 404 members are radially withdrawn to produce a stripping action.

In the stripping operation, during the upstroke of the press, members 400, 404, 410, 414, and 416 initially rise together, with the product locked within them, to strip the product from stationary bottom die 402. When the upward movement of pad 410 and segments 404 is stopped by stop members 410', which surround the pad 410, members 400, 414, 416 and 418 continue to rise until the surfaces 419 meet the lower part of surfaces 412. The die segments 404 then spread radially out upon further upward movement of surface 419. This pulls the segments 404 away from the product and allow it to drop either on the die 402 or on the knockout head 424 or on both, as desired. The product is then removed by tongs or the like. The head 424 is lowered in time not to interfere with a subsequent forming operation on a fresh product 98 which can be placed in the press.

The die segments 404 may be made radially and slidably movable on pad 410 by any desired means. For example, in FIGURES 18 and 19, bolts 450 may be attached to the segments 404, with a pair of bolts for each segment, if desired. The bolts 450 may pass loosely through openings 452 in stationary lugs or members 454 which are fixedly secured to plate or pad 410. Compression springs 456 pull outwardly on bolts 450 and segments 404 by means of bolt nut constructions 458.

Figure 18:
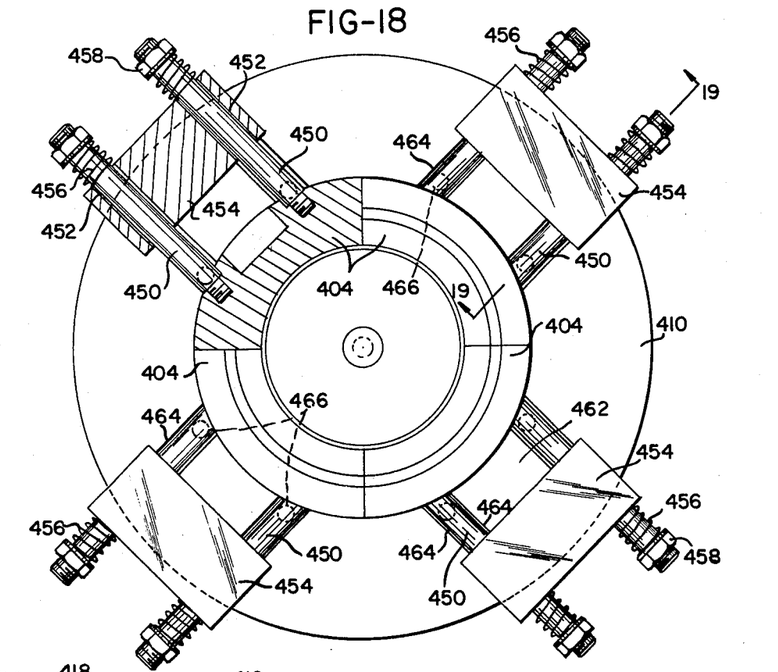
FIG. 18 is a plan view, partly in cross section, and in reduced scale, of part of the apparatus shown in FIG. 13.
Figure 19:
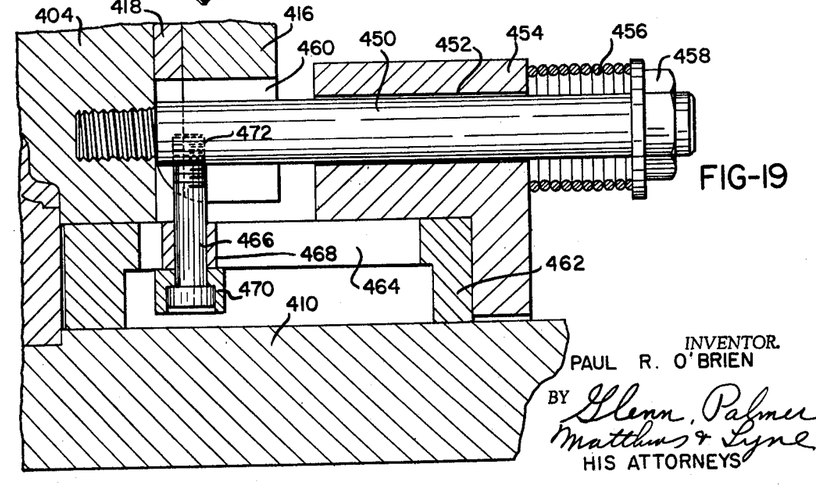
FIG. 19 is a cross section, in enlarged scale, along line 19—19 of FIG. 18.

The vertically movable cam members 416 and 418 may each have a slot construction 460 to permit them to straddle the bolts 450 where required.

The segments 404 are guided in their sliding motion on pad 410 and are locked against lifting action from the pad 410 by guide and lock members 462 which are fixedly secured to the pad 410. The members 462 have slots 464 in which the screw bolt constructions 466 travel with the rollers 468 guiding the bolts 466 outwardly and inwardly and with the heads 470 locking the bolts 466 against lifting action from pad 410. The bolts 466 and 450 are threadedly or otherwise interconnected at 472, so that the segments 404 are indirectly slidably guided along pad 410 and are locked against lifting action from the pad 410 by the constructions shown in FIGURES 18 and 19.

The features of FIGURES 18 and 19 may be applied to move and control the movement of segments 330, 332 and 334 of FIGURE 12, if desired, Conversely, the cam features of FIGURE 12 may be used to move the segments 404 of FIGURE 13, if desired.

The product of FIGURE 13 may be cold struck in a cold strike die to form the rims 108 of FIGURE 7 with rib free edges at 110 to permit use of the usual tire mounting and unmounting tools, and also to finish the rims 108 to more accurate dimensions, if desired.

Other finishing operations may be performed on the wheel 303 of FIGURE 7, such as the punching of valve hole 111, bolt holes 104, hub receiving hole 106, etc. Etching, polishing, painting, and any other desired finishing operation may also be done.

The foregoing method is particularly useful for quantity production of large numbers of wheels for automobiles and the like.

The oppositely extruded walls 82 and 84 in FIGS. 8–11A can be extruded with excess length which can be trimmed off the ends of such walls.

The simultaneous production of the wrought metal reinforcing ribs homogeneously formed at 442 and 444 on the exterior walls of the tire receiving walls of the wheels 303, FIGURE 7, produces wheels of relatively great strength and beauty.

When these wheels are made of aluminum alloys as described, their strength is very great compared to their weight and their brilliance adds great beauty to their appearance.

FIGS. 20–23 show two other wheel embodiments of the invention.

Figure 20:
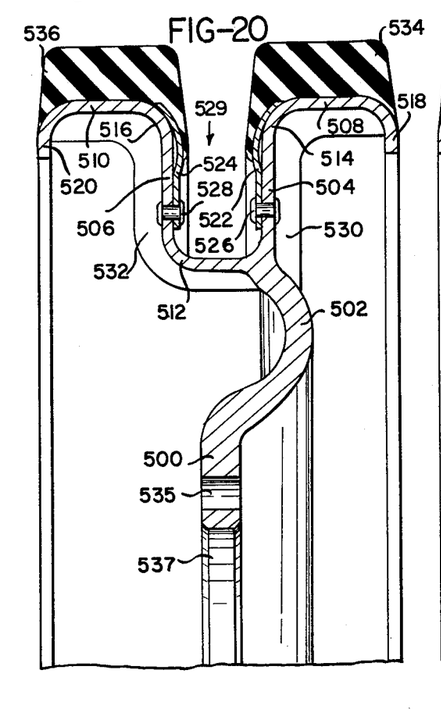
FIG. 20 is a transverse cross section of part of another embodiment of a tire mounting wheel according to this invention, taken along line 20—20 of FIG. 21.
Figure 21:
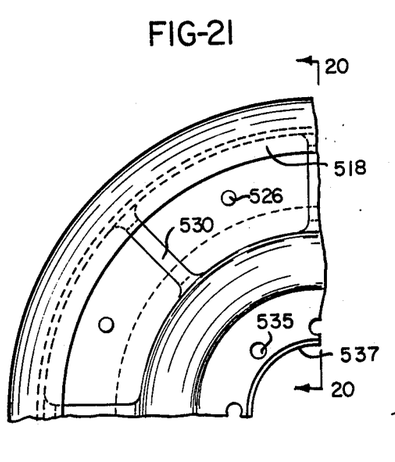
FIG. 21 is a side elevation of a portion of the wheel shown in FIG. 20.

The wheel of FIGS. 20 and 21 includes a web 500, with a crown 502, which is integral with two substantially flat walls 504 and 506 which are integral respectively with two substantially cylindrical walls 508 and 510. These walls have merging curves or constructions 512, 514 and 516.

The walls 508 and 510 are formed or spun respectively at 518 and 520 into inward rims.

The walls so far described may be made of aluminum, such as of aluminum alloys 2014–T4, 2024–T4, 7002–T6 and the like.

Steel wear discs 522 and 524 may be riveted at 526 and 528 respectively to the walls 504 and 506 and may have resilient bowed portions, as shown, which are resiliently biased with their ends spring biased against the merging portions 514 and 516. The discs 522 and 524 may each be made in half discs so they may be assembled into the groove 529.

Ribs 530 and 532 may be integrally formed on the wheel.

Solid rubber tires 534 and 536 may be vulcanized on the wheel as shown.

Rubber strip material may be wound on the wheel with abutting ends. Then the material may be vulcanized on the wheel.

Bolt holes 535 and axle or hub receiving holes 537 may be formed in the web 500.

The wheels may be made substantially in the same manner above described in connection with FIGS. 1–17, as is obvious in view of this disclosure. However, the rims 518 and 520 may be turned by separate tools, as is likewise obvious in view of this disclosure.

Figure 22:
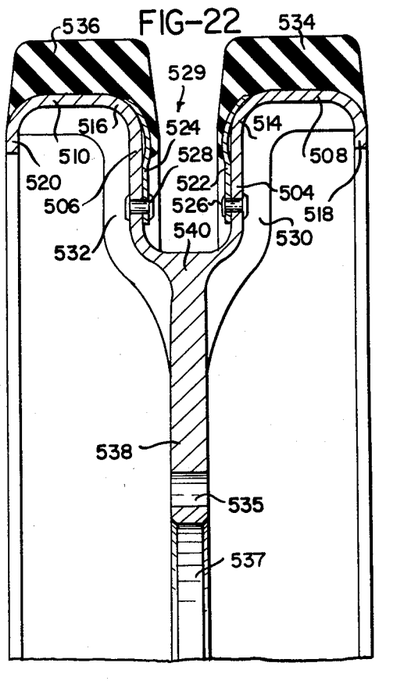
FIG. 22 is a transverse cross section of part of a further embodiment of a tire mounting wheel according to this invention, taken along the line 22—22 of FIG. 23.
Figure 23:
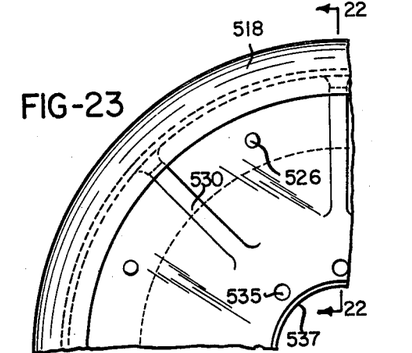
FIG. 23 is a side elevation of a portion of the wheel shown in FIG. 22.

The wheels of FIGS. 22 and 23 may be substantially the same as disclosed with respect to FIGS. 20 and 21. However, the crown 502 is omitted at 538. Also the wall 512 is changed to a symmetrical fork at 540. Otherwise the two embodiments of FIGS. 20–23 may be substantially the same.

The wheels of FIGS. 20–23 are particularly useful for use on vehicles that move on revolving tracks, and may be used as bogie wheels.

These wheels are used in the middle portions of the revolving tracks. The central teeth of the tracks enter the central groove 529 of the wheels. The steel discs 522 and 524 resist the wearing action of the track teeth and prevent the walls 504 and 506 from being quickly worn out by the teeth of the revolving tracks.

This invention is particularly advantageous when the products are made of ductile aluminum, for example, such as aluminum alloys known in the industry as Nos. 6061–T6; 2014–T4; 2020–T4; 7002–T6; and others which are sufficiently ductile for the operations herein described, but which may be rendered strong enough for the uses intended for the products.

The following comparative tests shown the highly desirable qualities of the wheels of this invention.

Rim Roll test

Automobile wheels are given accelerated tests under excessive loads for purposes of determining whether they are strong enough for long service life. One of these tests is known as the "Rim Roll test," in which standard tires are mounted on the wheels and are then placed to roll on top of a smooth surfaced steel drum which has an outer diameter of 5 feet and has its axis extending horizontally. The drum is rotated during the test at 145 r.p.m. (about 25 m.p.h. peripheral speed). The tires are tubeless and inflated to 65 p.s.i. Air is continuously blown on the tire surfaces to cool them during the test. The wheel is bolted on a freely rotatable axle carried on the end of a pivoted supporting arm, and the arm carries sufficient dead weight to apply an axial load of 2825 lbs. to the wheel. The test apparatus includes automatic means to lift the wheel off the drum when the tire loses air, either through failure of the tire (which occurs more frequently than failure of the wheels) or through a crack developing in the wheel rim which allows escape of air from the tire. Upon failure of a tire, it is replaced with another tire, and the test is resumed.

The automobile manufacturer which specified the above-identified rim roll testing apparatus specified 500,000 revolutions of the wheel on the drum as the minimum for commercial acceptance. For purposes of comparison, 8.00–14 tires were mounted on aluminum alloy wheels made in accordance with the applicant's invention (in the form illustrated in FIG. 7) and on corresponding steel wheels selected at random from the production line, and the wheels were rim roll tested under the same conditions, with the following results:

| | Weight of Wheel, Lbs. | Rim Roll Cycles Before Failure |
|---|---|---|
| Unitary Wrought Aluminum Alloy Wheels: | | |
| (1) 6061 alloy (T–6 temper) | 9.84 | 1,457,696 |
| (2) 6061 alloy (T–6 temper) | 9.93 | 1,730,900 |
| (3) 2014 alloy (T–4 temper) | 10.16 | 1,689,121 |
| (4) 2014 alloy (T–4 temper) | 10.06 | 1,455,674 |
| Steel wheels: | | |
| (5) Standard | 16.62 | 1,235,384 |
| (6) Standard | 16.80 | 1,290,061 |
| (7) Standard | 16.80 | 1,537,199 |

Rotating Fatigue test

Failures of the wheel in the Rim Roll test occur in the rims. In order to test the web area of the wheel between the rims and the hub, and lug retention and strength, another test is used, known as the "Rotating Fatigue test." In this test no tire is mounted on the wheel. Instead, the outer periphery of the wheel is clamped to the head of a power lathe, and the flanged end of a shaft is bolted to the wheel through its standard bolt holes. The shaft is about 3 feet long and its remote end carries a dead weight which applies 1695 foot-pounds of bending moment to the hub area of the wheel. The lathe head, wheel and shaft are rotated concentrically at 188 r.p.m. until the wheel fails.

Wheels like those subjected to the Rim Roll test were given the Rotating Fatigue test. One of these wheels, made of 6061 aluminum alloy at T–6 temper weighed 9.87 lbs. and failed at 157,634 cycles of the Rotary Fatigue test. Two other wheels, made of 2014 aluminum alloy at T–4 temper, weighed 10.10 and 10.28 lbs. and failed at 148,299 and 176,663 cycles, respectively of the Rotating Fatigue test. In comparison, the minimum acceptable standard for Rotating Fatigue is 30,000 cycles, and standard steel wheels of comparable size and shape normally fail after about 100,000 cycles of the Rotating Fatigue test.

Typical aluminum wheels used in the above-mentioned tests were made by semicontinuously casting cylindrical logs of 2014 and 6061 aluminum alloy. The logs were homogenized for about 8 hours at 935° F. in the case of 2014 alloy, and for 4–8 hours at about 1025° F. in the case of 6061 alloy, and then were cut into discs 3 inches thick. The discs were grit-blasted to clean and slightly roughen the surface, were sprayed with colloidal graphite for lubrication, and were preheated to about 750–800° F. in the case of 2014 alloy and about 800–850° F. in the case of 6061 alloy. Upset dies like those shown in FIGS. 3 and 4 were sprayed with conventional forging die lubricant, and the preheated discs were upset forged to a thickness of about 1 inch and then peripherally trimmed to reduce the weight from about 15 pounds to about 11 pounds, and reduce the diameter from about 15 inches to about 12 inches. The forged blanks were sprayed with colloidal graphite and raised to the same preheat temperatures used for upset forging before being placed in a forward and reverse extrusion press, like that illustrated in FIG. 8 and rated at 6000 tons. The down stroke portion of the press which is in contact with the blank takes about ⅓ second. The blank is compressed from its original thickness of about 1 inch to an average of about ¼ inch across the transverse web, so that the resultant movement of the metal takes place very rapidly. Before this operation the punches were preheated at about 350–400° F. The extruded product was trimmed, again lubricated and preheated as before, and given an initial forming in a press like that shown in FIG. 12, and then lubricated as before and raised to solution heat-treat temperature (just above 930° F. for approximately 20 minutes, in the case of 2014 alloy, and about 985° F. for 12–15 minutes in the case of 6061 alloy) before being given a second forming operation in a press like that shown in FIG. 13. Immediately after this last operation the product was removed and first quenched in boiling water and then subjected to an airblast to bring its temperature down to room temperature. Thereafter the 2014 alloy wheels were allowed to self age for 48 hours and the 6061 alloy wheels were artificially aged for about 10 hours at 350° F. For purposes of the tests, lug bolt holes and hub openings were machined out, but this could be performed in other ways, such as by punching in conjunction with a final forming or coining operation.

This invention is advantageous when the products, such as wheels, are made of relatively more ductile metal having relatively lower melting temperature and relatively greater coefficient of thermal expansion when compared with the tool metal from which the extruding and forming tools disclosed herein are made. For example, this invention may be used to make products, such as wheels, from aluminum alloys the same as or equivalent to aluminum alloys 6062–T6, 6061–T6, 2014–T4, 2024–T4, and 7002–T6. The extruding and forming tools herein disclosed may be made from (hot work) tool metal being the same as or equivalent to tool steels now well known. Aluminum alloys of this character have the same ratio of difference relative to their ductility, melting coil and coefficient of thermal expansion compared to those of tool steels above set forth. In the extruding press of FIG. 8, for example, these aluminum alloys may be extruded with the alloy and tool temperatures herein disclosed with an advantageous removal of the extruded product from the press.

While the present preferred embodiments of the invention, and methods of practicing the same, have been illustrated and described, it will be recognized that the invention may be otherwise variously embodied and practiced within the scope of the following claims.

What is claimed is:

1. Apparatus for producing a wrought wheel of ductile metal comprising a first extrusion head, a second extrusion head concentric thereto and axially movable relative to said first head, a die concentric with and surrounding said extrusion heads, the internal surface of the die member being conical with the apex end thereof extending in the direction of the first head, said conical interior surface coaxially surounding both said first and second extrusion heads, the arrangement being such that upon converging movement of the two extrusion heads metal from a disc thereof initially between the heads will be extruded in both directions between the annular openings existing between the extrusion heads and said die to form a product with cylindrical members and subsequent retraction of the second head while maintaining the die fixed relative to the first head will tend to wedge the extruded member between the die and first head to permit removal of the second head, whereafter movement of the die relative to the first head in the direction in which the second head was removed frees the extruded member from the first head.

2. Apparatus as in claim 1 wherein each extrusion head is supported upon a member of less diameter than the head so as to prevent frictional drag upon the member extruded thereby.

3. An apparatus for extruding an extruded cylindrical member having an essentially H cross-section with two oppositely extruded cylindrical walls joined to a compressed transverse web comprising: a first punch having a circular protruding first extrusion head adjacent to and around a generally flat surfaced leading first punch end; a second punch having a circular protruding second punch having a circular protruding second extrusion bead adjacent to and around a generally flat surfaced leading second punch end, said extrusion beads being coaxial, and said punches being longitudinally relatively movable toward and away from each other respectively for compressing a blank to form said cylindrical member and for removal of said cylindrical member; and a die having an internal cylindraceous surface coaxial with and surrounding said extrusion beads to produce with said beads two annular relatively short extruding slots through and beyond which major parts of said cylindrical walls are oppositely extruded, said internal cylindraceous surface being slightly conical where it forms said annular extruding slots, means on said cylindraceous surface and on said second punch for oppositely engaging the cylindrical member wall part extruded therebetween to pinchingly restrain premature retraction of the extruded cylindrical member axially from said second punch, said die being longitudinally movable in a direction coaxial with said extrusion beads for discontinuing engagement of said cylindrical member extruded wall part by said means on said cylindraceous surface, to relieve pinching restraint of the extruded cylindrical member to permit the removal of said extruded cylindrical member from the apparatus.

4. An apparatus according to claim 3 in which said first punch is movable toward and away from said second punch, and in which said second punch is stationary, and in which said die remains substantially stationary while said cylindrical walls are being extruded and while said first punch is moving away from said second punch and out of one extruded cylindrical wall and moves with said extruded cylindrical member to remove the other cylindrical wall from said second punch.

5. An apparatus according to claim 4 having fluid pressure means causing said die and cylindrical member to move away from said second punch.

6. A system for stripping an exteriorly substantially cylindrically extruded workpiece from extrusion apparatus including opposed, axially relatively movable first and second punches each having a circularly enlarged extrusion head supported on a member of less diameter than the respective extrusion head, the second punch having a level of greatest diameter thereof intermediate the axial extents of the extrusion head thereof; and a die having an internal surface circumferentially surrounding the workpiece and punches during extrusion of the workpiece into annuluses defined between the die and the respective punches, wherein the improvement comprises: means for withdrawing the first punch axially from the extruded workpiece; and means for ensuring that the extruded workpiece remains with the second punch as the first punch is axially withdrawn from the extruded workpiece, the ensuring means including: said die internal surface having conically curved portion axially extending, after workpiece extrusion and before withdrawal of said first punch, from a first level circumferentially surrounding said first punch to a second level axially beyond the juncture of the circularly enlarged extrusion head and reduced diameter support member of the second punch, said conically curved surface portion diminishing in diameter as it proceeds from said first level toward said second level so as to exert substantially greater contact pressure on the exteriorly substantially cylindrical extruded workpiece adjacent said second punch adjacent the juncture of the circularly enlarged extrusion head and reduced diameter support member of the second punch, than in the rest of the region where said exteriorly substantially cylindrical extruded workpiece is surrounded by said conically curved surface portion whereby the workpiece is pinched between the die conically curved surface portion and second punch circularly enlarged extrusion head as said first punch is axially withdrawn from the workpiece; and means for moving said die, subsequent to withdrawal of said second punch from said workpiece, axially in the direction of withdrawal of said first punch, sufficiently far that said second level on said die conically curved surface portion passes the level of greatest diameter of said first punch extrusion head, whereby the pinching action between the die and second punch is relieved to permit removal of the extruded workpiece from the die and second punch.

7. The system of claim 6 wherein said die is constructed and arranged to engage and move the extruded workpiece axially away from the second punch as said die is moved by said die moving means.

8. An apparatus for extruding an extended cylindrical member having an essentially H cross-section with two oppositely extruded cylindrical walls joined to a compressed transverse web comprising: a first punch having a circular protruding first extrusion bead adjacent to and around a generally flat surfaced leading first punch end; a second punch having a circular protruding second extrusion bead adjacent to and around a generally flat surfaced leading second punch end, said extrusion beads being coaxial, and said punches being longitudinally relatively movable toward and away from each other respectively for compressing a blank to form said cylindrical member and for removal of said cylindrical member, one of said punches having a plurality of longitudinal rib forming grooves circumferentially distributed around its respective extrusion bead, said one punch having further a plurality of scoops formed in its respective punch end and connected to said rib forming grooves for scooping material from said blank to aid in forming said ribs, each scoop increasing in width, angularly of said one punch, and decreasing in depth, radially of said one punch, as it proceeds toward said punch end; and a die having an internal cylindraceous surface coaxial with and surrounding said extrusion beads to produce with said beads two annular relatively short extruding slots through and beyond which major parts of said cylindrical walls are oppositely extruded, means on said cylindraceous surface and on said second punch for oppositely engaging the cylindrical member wall part extruded therebetween to pinchingly restrain premature retraction of the extruded cylindrical member axially from said second punch, said die being longitudinally movable in a direction coaxial with said extrusion beads for discontinuing engagement of said cylindrical member extruded wall part by said means on said cylindraceous surface, to relieve pinching restraint of the extruded cylindrical member to permit the removal of said extruded cylindrical member from the apparatus.

References Cited
UNITED STATES PATENTS

| 3,263,315 | 8/1966 | O'Brien | 29—159 |
| 3,096,579 | 7/1963 | Waller | 72—354 |
| 2,513,323 | 7/1950 | Hensel et al. | 72—354 |
| 1,171,344 | 8/1816 | Legere | 72—267 |

CHARLES W. LANHAM, Primary Examiner

A. L. HAVIS, Assistant Examiner

U.S. Cl. X.R.

72—267, 354